(12) United States Patent
Williams

(10) Patent No.: US 7,260,590 B1
(45) Date of Patent: Aug. 21, 2007

(54) STREAMED DATABASE ARCHIVAL PROCESS WITH BACKGROUND SYNCHRONIZATION

(75) Inventor: William Williams, Chapel Hill, NC (US)

(73) Assignee: Cisco Technology, Inc., San Jose, CA (US)

( * ) Notice: Subject to any disclaimer, the term of this patent is extended or adjusted under 35 U.S.C. 154(b) by 75 days.

(21) Appl. No.: 09/752,607

(22) Filed: Dec. 27, 2000

(51) Int. Cl.
*G06F 12/00* (2006.01)
*G06F 17/30* (2006.01)
*G06F 7/00* (2006.01)

(52) U.S. Cl. ............... 707/204; 707/8; 707/200; 707/202; 707/203

(58) Field of Classification Search ............ 707/204, 707/200, 202, 203, 1
See application file for complete search history.

(56) References Cited

U.S. PATENT DOCUMENTS

| | | | | |
|---|---|---|---|---|
| 5,403,639 A | * | 4/1995 | Belsan et al. | 707/204 |
| 5,555,371 A | * | 9/1996 | Duyanovich et al. | 714/13 |
| 5,613,060 A | * | 3/1997 | Britton et al. | 714/15 |
| 5,812,398 A | * | 9/1998 | Nielsen | 713/200 |
| 6,026,414 A | * | 2/2000 | Anglin | 707/204 |
| 6,065,018 A | * | 5/2000 | Beier et al. | 707/202 |
| 6,085,298 A | * | 7/2000 | Ohran | 711/162 |
| 6,119,128 A | * | 9/2000 | Courter et al. | 707/202 |
| 6,304,980 B1 | * | 10/2001 | Beardsley et al. | 714/6 |
| 6,408,310 B1 | * | 6/2002 | Hart | 707/201 |
| 6,430,577 B1 | * | 8/2002 | Hart | 707/201 |
| RE37,857 E | * | 9/2002 | Browne | 379/114.1 |
| 6,453,356 B1 | * | 9/2002 | Sheard et al. | 709/231 |
| 6,505,216 B1 | * | 1/2003 | Schutzman et al. | 707/204 |
| 6,640,217 B1 | * | 10/2003 | Scanlan et al. | 701/1 |

* cited by examiner

*Primary Examiner*—Apu Mofiz
*Assistant Examiner*—Cindy Nguyen
(74) *Attorney, Agent, or Firm*—Marger Johnson & McCollom, P.C.

(57) ABSTRACT

A streamed database archival process with background synchronization. Archive logs are streamed asynchronously such that a plurality of files can be transferred simultaneously from a host operational database to a backup archive database. By streaming the logs, the backup database is kept up to date and backlogs can quickly be resolved. Furthermore, an automatic recovery process is run in the background. This process automatically detects files on the backup database which may have been accidentally deleted or corrupted. The process recopies those missing or corrupted files from the host database without any human intervention.

17 Claims, 4 Drawing Sheets

STREAMED DATABASE ARCHIVAL PROCESS WITH BACKGROUND SYNCHRONIZATION

FIELD OF THE INVENTION

The present invention relates to an improved archival process for facilitating database backup. More particularly, the present invention pertains to a streamed database archival process with background synchronization.

BACKGROUND OF THE INVENTION

Databases are used for accepting, storing, and providing, on demand, data for multiple users. A database serves as a central repository of data which can be accessed by any number of different computers and users at any time. Databases find use in many different fields, such as for storing medical information, financial transactions, web sites, etc. Indeed, databases are becoming crucial to the operation of many companies. For example, a production database is often used by a company to track orders placed by customers, control inventory, monitor the workflow during assembly, generate invoices, etc.

Unfortunately, databases are susceptible to becoming disabled due to hardware breakdowns, software glitches, network hangups, accidents, disasters, human error, etc. In many instances, it would be catastrophic if data could not be accessed, or worse, if data were to be permanently lost due to a database failure. Because there can never be a guarantee that a database is always up and running, companies have implemented backup databases. And depending on the degree of importance of the data or function of a particular database, several different copies of the same data are often archived in multiple databases at different geographical locations on different storage facilities. In case of a failure in the primary operational database, the company can rely on the backup database. The company can switch from the primary operational database to the backup database in a matter of minutes.

Since data in the primary database is constantly being added, deleted, or otherwise modified, the backup database must likewise be updated so that it contains a mirror copy of the data residing on the primary database. Rather than copying over the entire database each and every time the operational database is updated, the backup database is periodically updated by copying over only the new changes since the previous update. For instance, the operational database can create an archive log which is used to store a pre-determined number of new transactions. When the archive log is full, that archive log is sent to the backup database. The backup database stores the archive log. In this manner, the backup database is kept current.

Although this archive process is simple and straightforward, it suffers from several drawbacks. One very important issue is that if a database administrator inadvertently removes a log on the receiving host, it will need to be manually recopied because prior art processes would only copy a log once and then move on. There is no mechanism for recopying. A related issue is that there is an inherent amount of danger in corrupting or deleting a log file as it is being manually recopied. In that event, the backup database on the receiving side is nullified and needs to be fully recopied. This is highly undesirable as it causes downtime for clients and a copious amount of human labor must be exerted just to return service to the application.

Another issue with the prior art archiving processes is that they could only sequentially transfer one log at a time. If there were a backlog or a delay (e.g., loss of network connectivity), logs would pile up on the sending host, thereby resulting in the data on the backup database becoming more and more stale. There is no real way to recoup from a backlog other than to manually copy many logs in batch mode and risking data loss or corruption through human error.

Therefore, there exists a need in the prior art for an improved archiving process. The present invention provides a unique, novel solution to these and other archival problems.

SUMMARY OF THE INVENTION

The present invention pertains to streamed database archival process with background synchronization. An operational host database saves all transactions in an archive log for backup purposes. When a number of archive logs have been saved, they are transferred to a backup database which resides on a different device at a geographically different site. These archive logs are streamed asynchronously such that multiple logs can be transferred simultaneously from the host operational database to the backup archive database. By streaming the logs, the backup database is kept constantly updated and backlogs can quickly be resolved. Furthermore, an automatic recovery process is run in the background. This process automatically detects files on the backup database which may have been accidentally deleted or corrupted by comparing file systems of the host database to that of the backup database. The process recopies those missing or corrupted files from the host database to the backup database without any human intervention.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

An improved archival process for facilitating database backup is described. Specifically, a streamed database archival process with background synchronization is disclosed. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Figure 1:
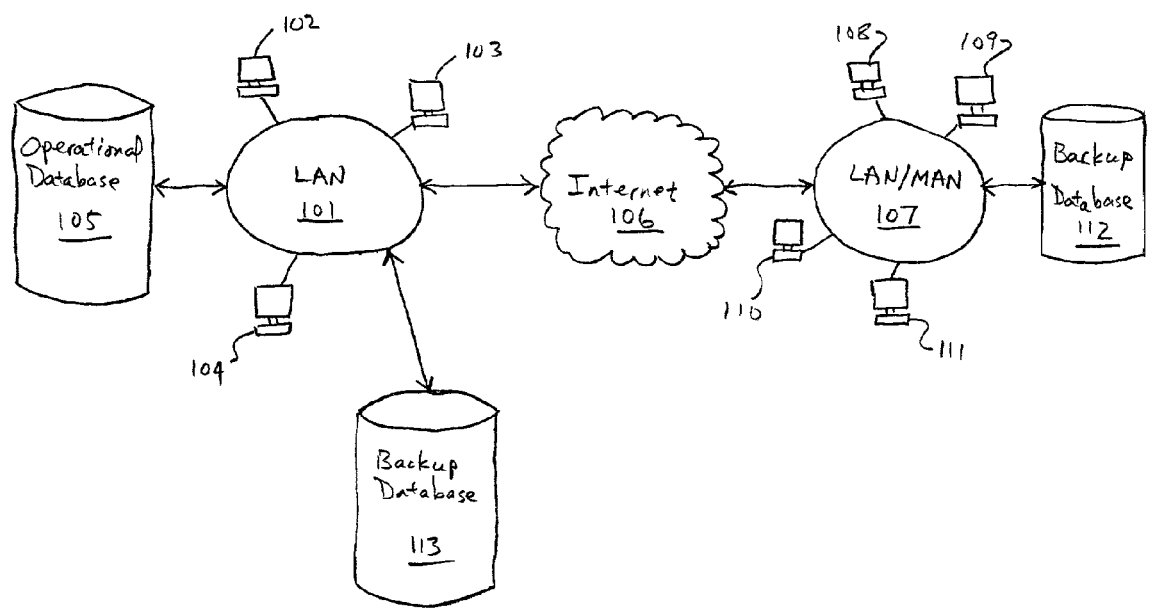
FIG. 1 shows an archival system upon which the present invention may be practiced.

Referring to FIG. 1, an archival system upon which the present invention may be practiced is shown. A local area network (LAN) 101 is used to route data between a number of computers 102-104 coupled to the LAN. A primary operational database 105 residing on a mass storage device (e.g., disk array) is also coupled to LAN 101. Thereby, any number of users can access operational database 105 via LAN 101. An exemplary database is Oracle 7 relational data base. In addition, the users can gain access to the Internet 106 via LAN 101. Another local area network/metropolitan area network (LAN/MAN) 107 coupled to the Internet 106 provides networking between a number of users 108-111. A backup database 112 is coupled to LAN/Man 107. The backup database 112 is situated at a different geographical location than the operational database 105. The backup database 112 contains archived copy of the complete set of data residing on operational database 105. New transactions stored on operational database 105 are stored as files in an archive log. The archive log is then transferred from the host operational database 105 to the receiving backup database 1112. The present invention pertains to the process by which the log transfers are handled and is described in detail below. The transfers can be made through a company's intranet, a virtual private network, or on a dedicated link. Optionally, one or more additional backup databases, such as backup database 113, can be set up and maintained. If operational database 105 were to fail, the backup database (e.g. either backup database 112 or 113) can be transitioned to function as the new operational database.

In the currently preferred embodiment, archive logs are transferred from the host database to the receiving backup database in the form of multiple asynchronous streams. In other words, rather than queuing logs to be sent sequentially whereby one archive log is sent and then waiting for that transfer to complete before the next archive log can be sent, the present invention prepares the archive logs such that multiple archive logs can be transferred simultaneously. This is accomplished by setting up multiple streams, whereby each stream transfers one archive log. The archive logs can be sent asynchronously over multiple simultaneous streams. The advantage of utilizing multiple asynchronous streams is that if the backup process falls behind, it can quickly and expeditiously catch back up. In other words, suppose that a router goes down and archive logs build up on the host database because they cannot be sent to the backup database due to the failed router. Once the network is fixed, the host database can send multiple streams of archive logs. This means that the backup database can be updated much faster than before. The significance is that the archived data does not become too stale. If the host database were to fail, the backup database would more closely mirror the host database.

Figure 2:
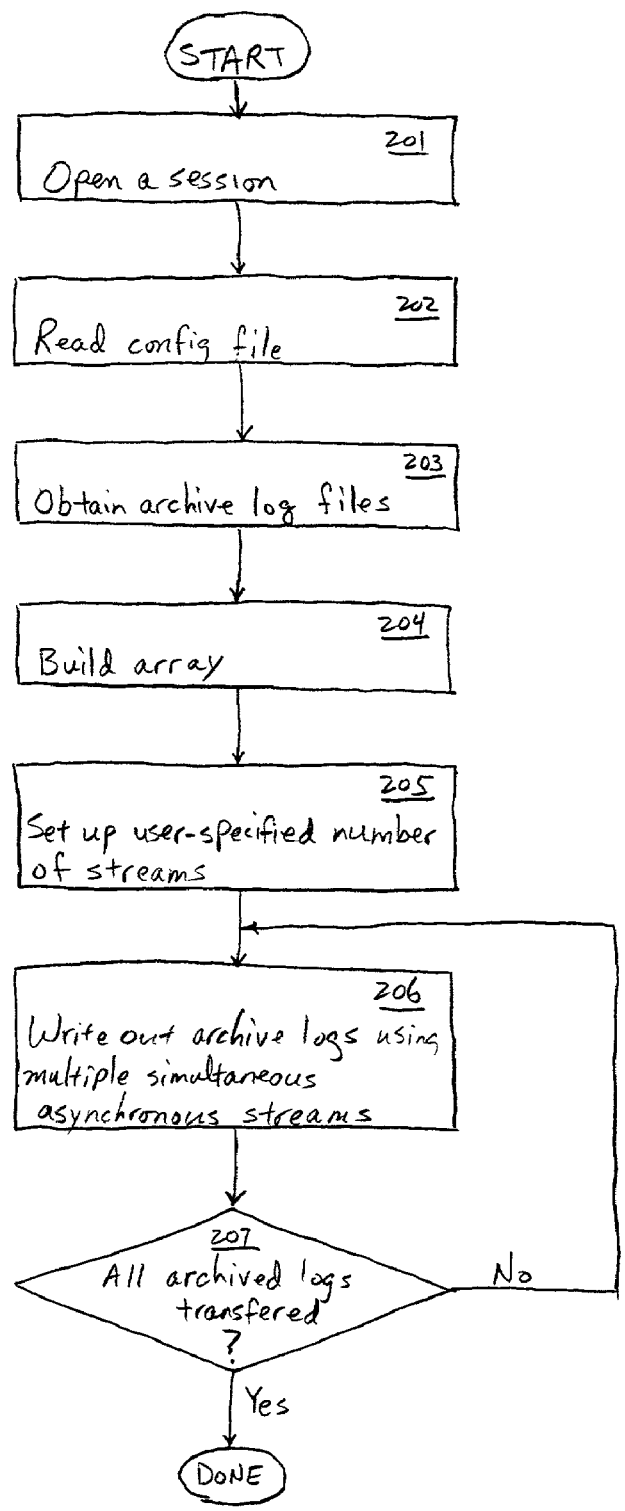
FIG. 2 shows a flowchart describing the steps for performing an asynchronous streamed archive log transfer according to one embodiment of the present invention.

FIG. 2 is a flowchart describing the steps for performing an asynchronous streamed archive log transfer according to one embodiment of the present invention. The first step 201 entails opening a session. A config file is read to determine user-specified options, step 202. These user-specified options could include the number of separate streams to transfer at a time, who to contact in case of an error, the host, the receiving destination, as well as address information). Based on the data read from the config file, the process reads the specified directory and obtains the appropriate archive log files, step 203. An array of all the specified archive log files which need to be transferred is then built, step 204. The specified number of streams are set up to transfer the archive log files, step 205. The archived log files are written out in multiple, simultaneous, asynchronous streams, step 206. This process repeats until all archived logs in the array have been transferred, step 207. It should be noted that towards the end of the process, streams may be sent sequentially once there are not enough archive logs left in the array to support multiple simultaneous streams. Moreover, this process is optimally run automatically in cron. Alternatively, it can be run by hand.

In one specific implementation, the process is written in PERL. The PERL program wakes up and reads a config file. It then shells over to the identified remote host and reads the appropriate file (e.g., thread1.dat) to obtain a starting number. An array of archive logs is then built to ship based on the delta between the starting number (e.g., thread1.dat) and the number of the last log created minus one (n−1). If compress is specified, the archive logs are zipped. The specified number of streams are then set up to rysnc transfer the archived logs.

In one embodiment of the present invention, automatic recovery of corrupted and/or missing archive logs is provided. Once an archive log has been copied over to the backup database, it may become corrupted. Occasionally, one of the archive logs stored on the backup database inadvertently gets deleted. In the past, the system administrator would have to research the problem, figure out which archive log was corrupted or missing and then manually recopy that archive log from the host database. With the present invention, this is all done automatically in the background. The present invention regularly checks the archived logs stored in the backup database against the archived logs maintained in the host database. If there is a discrepancy, the archive log at issue is recopied from the host database to the backup database. Thereby, this eliminates the need for any human intervention.

Figure 3:
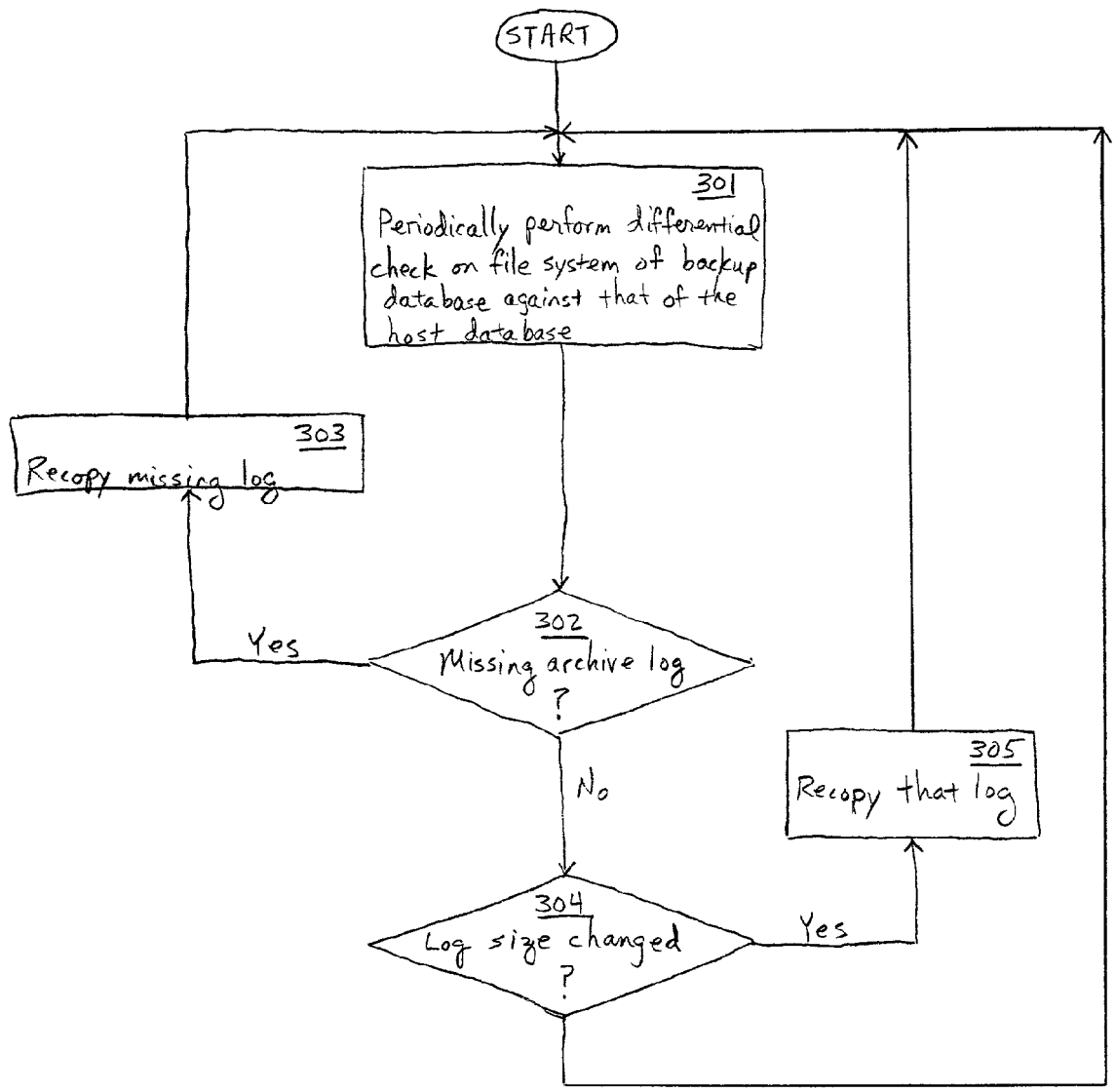
FIG. 3 shows a flowchart describing the steps for performing automatic recovery according to one embodiment of the present invention.

FIG. 3 is a flowchart describing the steps for performing automatic recovery according to one embodiment of the present invention. Upon start up, the process performs a differential check, step 301. It checks the local directory corresponding to the backup database against the host directory corresponding to the operational database. Based on the comparison between these two file systems, the process can determine whether an archive log is missing, step 302. Even though that particular archive log had already been copied over once before, it might have been deleted. The program automatically issues a command to instruct the host to transfer that particular archive log, step 303. That particular archive log is immediately transferred by the host even though the host had already previously transferred that archive log. In addition, based on the comparison between the host and local file systems, the process can determine whether there is a discrepancy in the size of any of the archive logs, step 304. This may be accomplished by performing a checksum. If the log size is different, this indicates that the log has become corrupted. The process issues a command to instruct the host to immediately transfer that particular log, step 305. The log is immediately transferred and copied onto the backup database. The process continues to periodically perform differential checks in the background, step 301. Thereby, the present invention can automatically catch and fix problems which may arise without any human intervention.

In the currently preferred embodiment, the present invention is implemented as a process and a PERL program known as Sync_arch. It utilizes standard streaming, rsh or ssh (for secure data transfer), and rsync, which are publicly available tools. Sync_arch is highly configurable and easy to install. It allows for configuration of multiple copy streams, which prevents backlogs, and enables recovery from backlogs. The use of rsync and its rolling checksum mechanism prevents log file corruption and verifies the integrity of the data. The algorithm behind Sync_arch allows for automatic recopying of logs that have been inadvertently removed, preventing operator intervention. Thereby, Sync_arch provides secure and fast data transfer that recovers quickly from errors and helps keep production and disaster databases in sync.

Figure 4:
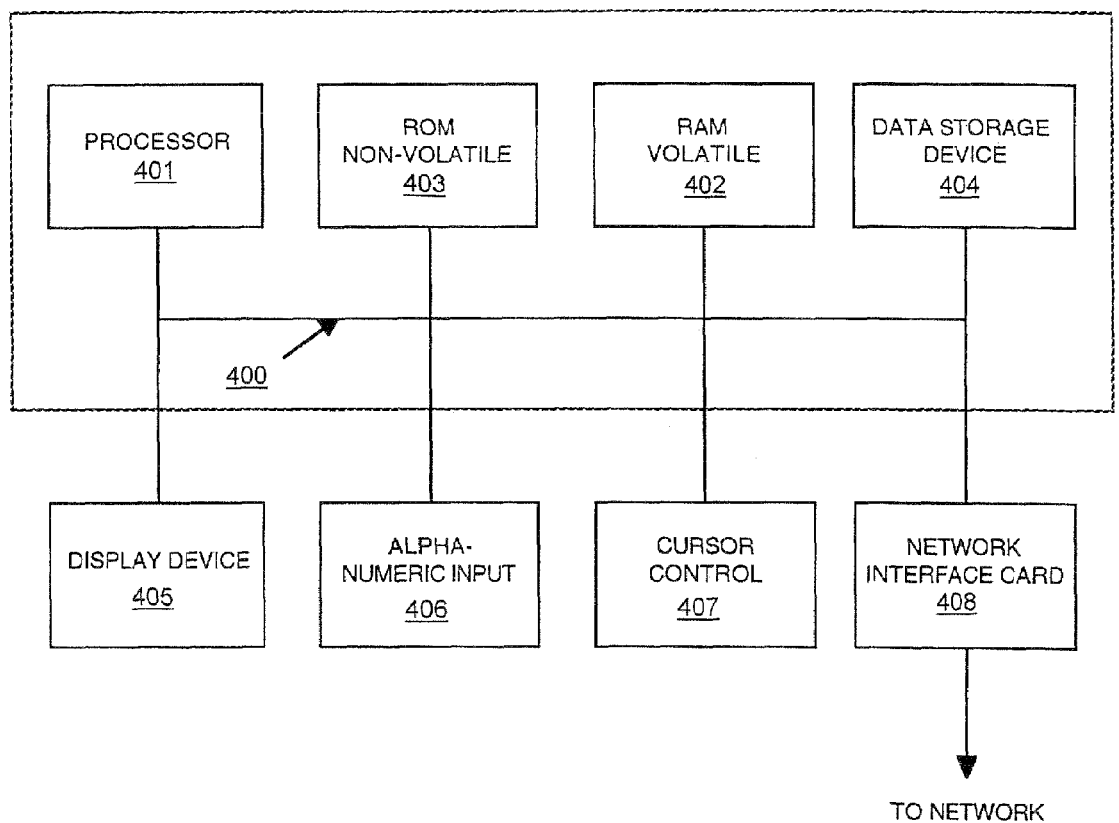
FIG. 4 shows an exemplary computer system upon which embodiments of the present invention may be practiced.

Referring now to FIG. 4, an exemplary computer system 490 upon which embodiments of the present invention may be practiced is shown. In general, computer system 490 comprises bus 400 for communicating information, processor 401 coupled with bus 400 for processing information and instructions, random access (volatile) memory 402 coupled with bus 400 for storing information and instructions for processor 401, read-only (non-volatile) memory 403 coupled with bus 400 for storing static information and instructions for processor 401. A data storage device 404 such as a magnetic or optical disk and disk drive is coupled with bus 400 for storing information and instructions, such as the Sync_arch program. An optional user output device such as display device 405 is coupled to bus 400 for displaying information to the computer user. Computer system 490 further comprises an optional user input device such as alphanumeric input device 406 including alphanumeric and function keys coupled to bus 400 for communicating information and command selections to processor 401, and an optional user input device such as cursor control device 407 coupled to bus 400 for communicating user input information and command selections to processor 401. Furthermore, a network interface card (NIC) 408 is used to couple computer system 490 onto, for example, a client-server computer system network. In such a network, computer system 490 can exemplify a client computer system and/or a server computer system.

Display device 405 utilized with computer system 490 may be a liquid crystal device, cathode ray tube, or other display device suitable for creating graphic images and alphanumeric characters recognizable to the user. Cursor control device 407 allows the computer user to dynamically signal the two-dimensional movement of a visible symbol (pointer) on a display screen of display device 405. Many implementations of the cursor control device are known in the art including a trackball, mouse, joystick or special keys on alphanumeric input device 406 capable of signaling movement of a given direction or manner of displacement. It is to be appreciated that the cursor control 407 also may be directed and/or activated via input from the keyboard using special keys and key sequence commands. Alternatively, the cursor may be directed and/or activated via input from a number of specially adapted cursor directing devices.

Therefore, a streamed database archival process with background synchronization is disclosed. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of archiving a database, comprising:
storing a plurality of archive logs comprising a plurality of transactions on an operational database;
transmitting a plurality of asynchronous streams to a backup database wherein a first asynchronous stream of said plurality of asynchronous streams is transmitted asynchronously with respect to a second asynchronous stream of said plurality of asynchronous streams, wherein each asynchronous stream of the plurality of asynchronous streams corresponds to a particular archive log of the plurality of archive logs, and wherein a predetermined number of the plurality of asynchronous streams, that is set by a user in a config file, are transmitted simultaneously in parallel; and
updating the backup database with the plurality of transactions.

2. The method of claim 1 further comprising:
comparing a plurality of files corresponding to a the backup database to a plurality of files of the operational database to determine whether there are any corrupt or missing files;
automatically transferring files from the operational database to the backup database which have been corrupted or deleted.

3. The method of claim 1, wherein the transmitting runs in cron.

4. The method of claim 1 further comprising running streaming rsynchs for copying data from the operational database to the backup database.

5. The method of claim 1 further comprising constructing an array of the plurality of archive logs which are to be transferred from the operational database to the backup database.

6. A method of performing automatic recoveries on an archived database, comprising:
comparing files residing on an operational database to files residing on a backup database;
determining whether there are any missing files by checking for files which exist on the operational database and which do not exist on the backup database;
recopying files from the operational database over to the backup database which are missing;
determining whether there are any corrupted files by checking for files which have a different size on the operational database as compared to corresponding file residing on the backup database;
recopying files from the operational database to the backup database which have become corrupted, wherein the automatic recovery process is run by a program automatically in the background without requiring initiation and is run independent of a complete system backup; and
transferring a predetermined plurality of the recopied files as asynchronous streams transferred in parallel from the operational database to the backup database.

7. The method of claim 6, wherein the plurality of files are streamed according to an rsync command.

8. The method of claim 6, wherein the comparing comprises performing a rolling checksum.

9. An archival system, comprising:
a backup database for storing a plurality of archive logs which represent data stored on an operational database;
a memory for storing instructions on how data is to be transferred from the operational database to the backup database, wherein the instructions include commands which cause the operational database to stream a plurality of archive logs asynchronously to be copied over to the backup database such that the backup database is updated with the data wherein a first asynchronous stream of a predetermined plurality of asynchronous streams is transmitted asynchronously with respect to a second asynchronous stream of said predetermined plurality of asynchronous streams corresponds to a particular archive log of the plurality of archive logs, and wherein the predetermined plurality of asynchronous streams are transmitted simultaneously in parallel.

10. The archival system of claim 9 comprising instructions stored in memory which automatically compares files on the operational database against files stored on the backup database to determine whether there are any missing or corrupted files and which automatically recopies files from the operational database to the backup database which have been deleted or corrupted.

11. A computer-readable medium having stored thereon instructions for transferring data from an operational database to a backup database for archival of data, comprising:
storing a plurality of archive logs comprising a plurality of transactions on the operational database;
transmitting a predetermined plurality of asynchronous streams to the backup database wherein a first asynchronous stream of said predetermined plurality of asynchronous streams is transmitted asynchronously with respect to a second asynchronous stream of said predetermined plurality of asynchronous streams, wherein each asynchronous stream of the predetermined plurality of asynchronous streams corresponds to a particular archive log of the plurality of archive logs, and wherein the predetermined plurality of asynchronous streams are transmitted simultaneously in parallel; and
updating the backup database with plurality of transactions.

12. The computer-readable medium of claim 11 further comprising:
comparing a plurality of files corresponding to a said backup database to a plurality of files of an operational database to determine whether there are any corrupt or missing files;
automatically transferring files from the operational database to the backup database which have been corrupted or deleted.

13. A computer-readable medium having stored thereon instructions for performing automatic recoveries on an archived database, comprising:
comparing files residing on an operational database to files residing on a backup database;
determining whether there are any missing files by checking for files which exist on the operational database and which do not exist on the backup database;
recopying files from the operational database over to the backup database which are missing;
determining whether there are any corrupted files by checking for files which have a different size on the operational database as compared to corresponding file residing on the backup database;
recopying files from the operational database to the backup database which have become corrupted, wherein the automatic recovery process is run by a program automatically in the background without requiring initiation and is run independent of a complete system backup; and
transferring a plurality of the recopied files as asynchronous streams transferred in parallel from the operational database to the backup database.

14. The computer-readable medium of claim 13, wherein the plurality of files are streamed according to an rsync command.

15. An apparatus for archiving a database, comprising:
means for storing a plurality of archive logs comprising a plurality of transactions on an operational database;
means for transmitting a predetermined plurality of synchronous streams to a backup database wherein a first asynchronous stream of said predetermined plurality of asynchronous streams is transmitted asynchronously with respect to a second asynchronous stream of said predetermined plurality of asynchronous streams corresponds to a particular archive log of the plurality of archive logs, and wherein the predetermined plurality of asynchronous streams are transmitted simultaneously in parallel; and
means for updating the backup database with plurality of transactions.

16. The apparatus of claim 15 further comprising:
means for comparing a plurality of files corresponding to the backup database to a plurality of files of an operational database to determine whether there are any corrupt or missing files;
means for automatically transferring files from the operational database to the backup database which have been corrupted or deleted.

17. An apparatus for performing automatic recoveries on an archived database, comprising:
means for comparing files residing on an operational database to files residing on a backup database;
means for determining whether there are any missing files by checking for files which exist on the operational database and which do not exist on the backup database;
means for recopying files from the operational database over to the backup database which are missing;
means for determining whether there are any corrupted files by checking for files which have a different size on the operational database as compared to corresponding file residing on the backup database;
means for recopying files from the operational database to the backup database which have become corrupted, wherein the automatic recovery process is run by a program automatically in the background without requiring initiation and is run independent of a complete system backup; and
means for transferring a plurality of the recopied files as asynchronous streams transferred in parallel from the operational database to the backup database.

* * * * *

UNITED STATES PATENT AND TRADEMARK OFFICE
CERTIFICATE OF CORRECTION

PATENT NO. : 7,260,590 B1 Page 1 of 1
APPLICATION NO. : 09/752607
DATED : August 21, 2007
INVENTOR(S) : William Williams It is certified that error appears in the above-identified patent and that said Letters Patent is hereby corrected as shown below:

Title Page, item [30]

Related U.S. Application Data should read

-- Provisional Application No. 60/254,004, filed on December 6, 2000. --

Signed and Sealed this

Twenty-second Day of July, 2008

JON W. DUDAS
*Director of the United States Patent and Trademark Office*

UNITED STATES PATENT AND TRADEMARK OFFICE
CERTIFICATE OF CORRECTION

PATENT NO. : 7,260,590 B1  
APPLICATION NO. : 09/752607  
DATED : August 21, 2007  
INVENTOR(S) : William Williams Page 1 of 1

It is certified that error appears in the above-identified patent and that said Letters Patent is hereby corrected as shown below:

At column 3, line 11, please delete "LAN/Man" and insert -- LAN/MAN --, therefor.

At column 3, line 14, after "contains" insert -- an --.

At column 3, line 19, delete "1112." and insert -- 112. --, therefor.

At column 4, line 14, delete "rysnc" and insert -- rsync --, therefor.

At column 6, line 19 of Claim 2, after "to" delete "a".

\* At column 7, line 7 of Claim 9, after "streams" insert -- , wherein each asynchronous stream of the predetermined plurality of asynchronous streams --.

At column 7, line 39 of Claim 12, after "to" delete "a".

\* At column 8, line 20 of Claim 15, after "streams" insert -- , wherein each asynchronous stream of the predetermined plurality of asynchronous streams --.

\* Patentee respectfully requests the correction of claims 9 and 15 to restore the claim language previously presented in the December 18, 2006 Amendment, and which was indicated as being allowed by the Examiner in the January 24, 2007 Office Action. Patentee inadvertently omitted the recited features during prosecution, without any deceptive intent.

Signed and Sealed this

Twenty-first Day of April, 2009

JOHN DOLL  
*Acting Director of the United States Patent and Trademark Office*